US010327534B2

(12) United States Patent
Fikri et al.

(10) Patent No.: US 10,327,534 B2
(45) Date of Patent: Jun. 25, 2019

(54) DISPLAY RACK FOR SHADES OF NAIL VARNISH

(71) Applicants: Fatima Fikri, Paris (FR); Sylvie Legastelois, Ansieres sur Seine (FR); Olivier Perrin, Chatillon (FR)

(72) Inventors: Fatima Fikri, Paris (FR); Sylvie Legastelois, Ansieres sur Seine (FR); Olivier Perrin, Chatillon (FR)

(73) Assignee: CHANEL PARFUMS BEAUTE, Neuilly sur Seine (FR)

( * ) Notice: Subject to any disclaimer, the term of this patent is extended or adjusted under 35 U.S.C. 154(b) by 214 days.

(21) Appl. No.: 15/027,100

(22) PCT Filed: Oct. 14, 2014

(86) PCT No.: PCT/FR2014/052609

§ 371 (c)(1),
(2) Date: Apr. 4, 2016

(87) PCT Pub. No.: WO2015/055940

PCT Pub. Date: Apr. 23, 2015

(65) Prior Publication Data

US 2016/0235185 A1 Aug. 18, 2016

(30) Foreign Application Priority Data

Oct. 15, 2013 (FR) ...................................... 13 60032

(51) Int. Cl.
*G09B 19/00* (2006.01)
*A45D 44/00* (2006.01)
(Continued)

(52) U.S. Cl.
CPC ........... *A45D 44/005* (2013.01); *A45D 29/00* (2013.01); *G09F 5/00* (2013.01)

(58) Field of Classification Search
USPC ............. 434/81, 98, 99, 100, 202, 365, 377; 132/73, 73.5, 285; 235/127
See application file for complete search history.

(56) References Cited

U.S. PATENT DOCUMENTS 383,389 A * 5/1888 Dushane ................ G09B 19/02 434/202
1,990,630 A * 2/1935 Bensel ................. A45D 44/005 132/333
(Continued)

FOREIGN PATENT DOCUMENTS

CH 355912 A 7/1961
CN 102328771 A 1/2012
(Continued)

OTHER PUBLICATIONS

International Search Report PCT/ISA/210 for International Application No. PCT/FR2014/052609 dated Jan. 9, 2015.
(Continued)

*Primary Examiner* — Kurt Fernstrom
(74) *Attorney, Agent, or Firm* — Harness, Dickey & Pierce, P.L.C.

(57) ABSTRACT

The invention relates to a display rack for shades of nail varnish, comprising a support and colored tabs which are mounted on the support in a mobile manner, independently from each other.

15 Claims, 3 Drawing Sheets

(51) Int. Cl.
*A45D 29/00* (2006.01)
*G09F 5/00* (2006.01)

(56) References Cited

U.S. PATENT DOCUMENTS

| | | | | | |
|---|---|---|---|---|---|
| 2,020,100 | A * | 11/1935 | Boyd | A45D 44/005 132/73 |
| 2,195,495 | A | 4/1940 | Popp | |
| 2,417,677 | A * | 3/1947 | Cohan | G09F 5/042 206/81 |
| 2,840,088 | A | 6/1958 | Kushner | |
| 2,987,827 | A * | 6/1961 | Carnegie, Sr. | G09B 19/02 434/202 |
| 3,703,040 | A * | 11/1972 | Hill | G09B 19/02 434/202 |
| 4,140,139 | A | 2/1979 | Aylott | |
| 4,262,432 | A * | 4/1981 | Hachimura | G09B 17/00 434/161 |
| D299,878 | S * | 2/1989 | Wienslaw | D28/56 |
| 5,154,656 | A * | 10/1992 | Milstein | A63H 33/04 434/259 |
| D345,442 | S * | 3/1994 | Gillan | D28/56 |
| 5,570,793 | A * | 11/1996 | Killough | A45D 44/005 132/73 |
| D386,823 | S * | 11/1997 | Carroll | D28/56 |
| 5,988,178 | A * | 11/1999 | Bair | A45D 31/00 132/285 |
| 6,598,608 | B1 * | 7/2003 | Downey | A45D 40/30 132/200 |
| 6,892,736 | B2 * | 5/2005 | Chang | A45D 31/00 132/73 |
| 6,964,110 | B2 * | 11/2005 | Shapiro | G01B 3/06 33/458 |
| 7,354,272 | B1 * | 4/2008 | Zev | G09B 1/36 434/188 |
| 8,616,886 | B2 * | 12/2013 | Clark | A45D 44/005 434/100 |
| D752,289 | S * | 3/2016 | Tegtmeyer | D28/56 |
| 9,380,853 | B2 * | 7/2016 | Ports | A45D 44/005 |
| 2009/0235946 | A1 * | 9/2009 | Kalla | A45D 44/005 132/200 |
| 2011/0303235 | A1 | 12/2011 | Sung | |
| 2012/0178055 | A1 * | 7/2012 | Reyzis | A45D 40/0087 434/100 |

FOREIGN PATENT DOCUMENTS

| | | | |
|---|---|---|---|
| FR | 2719557 | A1 | 11/1995 |
| GB | 421510 | A | 12/1934 |
| JP | S58-185111 | U | 12/1983 |
| JP | H10-291915 | A | 11/1998 |

OTHER PUBLICATIONS

Written Opinion of the International Searching Authority PCT/ISA/237 for International Application No. PCT/FR2014/052609 dated Jan. 9, 2015.

Japanese Office Action dated Jun. 12, 2018 for corresponding Japanese Application No. 2016-521669.

Chinese Office Action dated Jun. 25, 2018 for corresponding Chinese Application No. 201480056208.3.

* cited by examiner

Fig. 1
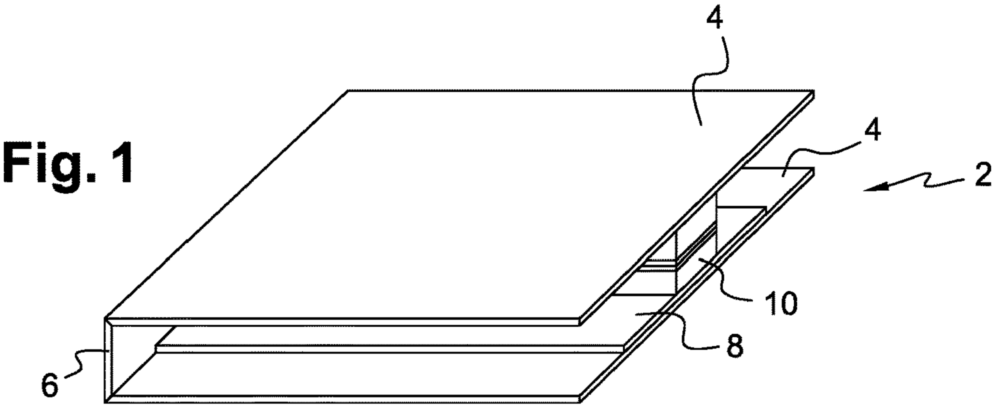
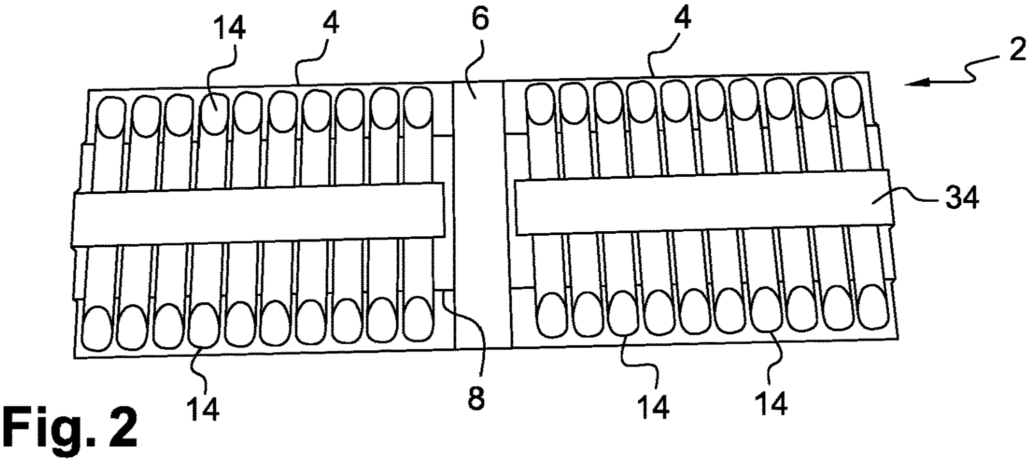
Fig. 2
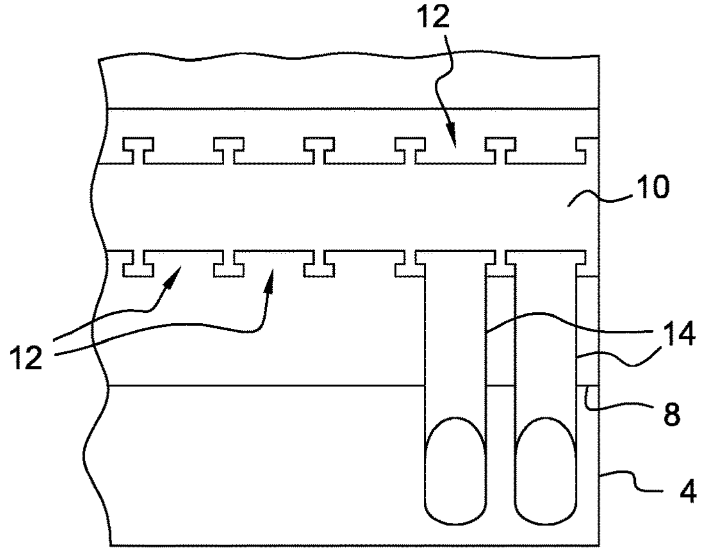
Fig. 3

DISPLAY RACK FOR SHADES OF NAIL VARNISH

This application is the U.S. National Phase application of PCT Application No. PCT/FR2014/052609 filed Oct. 14, 2014, which claims priority to the French Application No. 1360032 filed on Oct. 15, 2013, the contents of each of which are incorporated herein by reference.

FIELD OF THE INVENTION

The invention relates to display racks for shades of nail varnish.

BACKGROUND OF THE INVENTION

This type of display rack is sometimes called a nail art palette. It is used in sales outlets and allows customers to choose shades of nail varnish.

Existing display racks of this type have the general shape of a round or rectangular palette with kinds of petals radiating outwards. The petals have the shape of a fingernail and are decorated. The user who wishes to select a color or decoration for her nails can superimpose one of the petals from the palette on one of her nails. On some nail art palettes, the petals are mounted on the palette with a spring clip system so that they can be removed if necessary and replaced by other petals.

However, these operations are relatively difficult to perform and make it more complicated to choose the shades. In particular, the entire palette must be held in the hand to superimpose a petal on the nail, and while doing so, neither hand is resting on a firm support.

One objective of the invention is to simplify this choice.

OBJECT AND SUMMARY OF THE INVENTION

The invention therefore relates to a display rack for shades of nail varnish, which comprises a support and colored tabs which are mounted on the support in a mobile manner, independently from each other.

Thus, by moving a tab relative to the others without taking it off the support, it is possible to consider its shade independently of the others. Consequently, there is no need for the removal and refitting operations required with the display rack of the prior art described above. The finger can be placed successively under different tabs. It is therefore easier and faster to try different shades one after the other.

Preferably, each tab can rotate freely on the support.

Advantageously, each tab is mounted movably between a rest position and a test position in which the colored part extends farther from a bottom wall of the support than in the rest position.

Consequently, to try a shade, the user slides her finger between the bottom wall and the chosen tab.

Each tab could also be removably mounted on the support.

It is therefore easy to replace some tabs by others to update the shades for example.

Advantageously, the support has housings to hold the tabs, the housings being profiled in a direction perpendicular to a main plane of the support.

This is a convenient arrangement for mounting the tabs in the support. Preferably, the tabs are held in the housings with sufficient clearance to allow them to rotate relative to the support.

Thus, there is no need to provide specific means for rotatably mounting the tabs on the support.

Advantageously, the display rack comprises at least one cover to close an opening of the housings used to insert the tabs, hiding the openings.

The cover therefore closes the openings and hides them. Preferably, the display rack comprises magnetic means for holding the cover against the openings.

Advantageously, the display rack comprises:

at least two flaps movable relative to each other to define respectively open and closed positions of the display rack, and adapted to extend opposite one another when the display rack is in closed position, and magnetic means for holding the display rack in the closed position.

Preferably, there are at least two covers which form the means for holding in the closed position.

Thus, the same magnetic means immobilize the covers on the openings and immobilize the display rack in the closed position.

Advantageously, each tab has a body-dyed part with a shade different from that of at least another one of the tabs.

Since it is body-dyed, it matches more closely the varnish it represents and produces a better finish.

Preferably, each tab has a flared colored part that widens towards a free end of the tab.

The shape of the colored part is therefore more like the natural shape of a nail and it is easier to appreciate the effect obtained with the shade.

In one embodiment, each tab comprises a body to which the colored part is attached.

Thus, the tabs can have identical bodies, which makes the display rack easier to manufacture.

Advantageously, each tab comprises a body whose thickness decreases on approaching a free end of the tab. The colored part is therefore closer to the user's fingernail during the test.

Preferably, each tab has a cavity formed in a lower side of the tab at the colored part.

This cavity receives at least a part of the user's nail when she places her finger under the tab, which makes it easier to appreciate the effect of the shade at the fingertip.

Advantageously, the display rack comprises a bottom wall and a stand arranged so that, when each tab is in the rest position, the bottom wall is visible around it and the stand supports the tab at a distance from the bottom wall.

The bottom wall, which preferably has a plain color, makes it easier to compare the different shades. The distance makes the tabs more visible with respect to the bottom wall and makes it easier to insert a finger between the tab and this wall.

Preferably, at least the bottom wall is black.

This neutral and dark color makes the colored parts of the tabs stand out.

The invention also provides for a method for selecting a shade of nail varnish, wherein a display rack is supplied comprising a support and colored tabs, one of the tabs is moved relative to the support, independently of the other tabs and so that it remains connected to the support, and a finger is placed under the tab which has been moved.

BRIEF DESCRIPTION OF THE DRAWINGS

We will now describe one embodiment of the invention, referring to the attached drawings in which:

FIGS. 1 and 2 are respectively perspective and elevation views of a display rack according to one embodiment of the invention respectively in closed position and in open position;

FIG. 3 is an enlarged view of a part of the display rack of FIG. 2 with one of the covers removed;

MORE DETAILED DESCRIPTION

Figure 4:
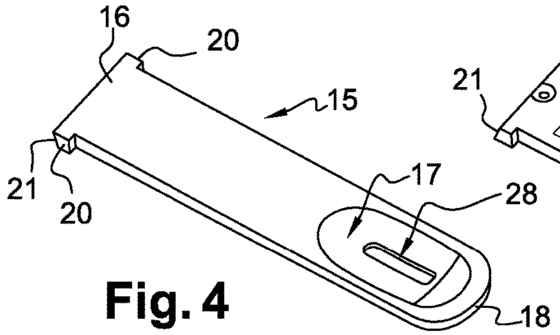
FIGS. 4 to 7 are perspective, top and side views of the body of one of the tabs of the display rack shown on the previous figures.
Figure 5:
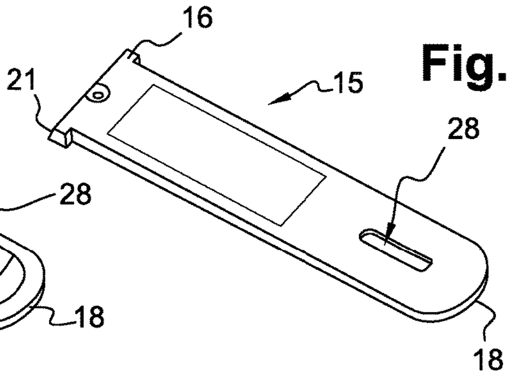
Figure 6:
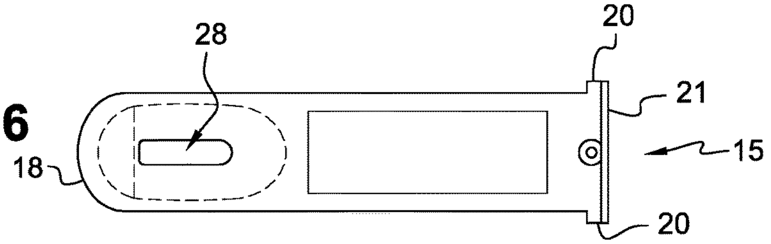

We will describe one embodiment of the display rack of the invention, referring to FIGS. 1 to 15.

The display rack 2 comprises here two main walls or bottom walls 4, in this case of rectangular shape, identical to each other and connected together by an intermediate wall 6 like a book. These three walls are flat. Thus, each of the two walls 4 is hinged to the intermediate wall and can be moved opposite the other main wall to form the closed position of the display rack illustrated on FIG. 1 or on the contrary extend in the plane of the other main wall to form its open position illustrated on FIG. 2.

In this case, the two parts of the display rack associated with the respective main walls 4 are identical to each other (except for the polarity of the magnets as discussed below) and symmetrical to each other as shown on FIG. 2. We will therefore only describe the part of the display rack shown on the right on this figure.

In the remainder of the document, "longitudinal direction" means the direction from one of these two parts to the other and "height" means the direction perpendicular to the longitudinal direction and parallel to the walls 4.

The wall 4 carries a flat rectangular stand 8 whose lower side is applied against the upper side of the wall 4. The sides of the stand extending along the height of the display rack coincide with those of the main wall 4. Its sides parallel to the longitudinal direction extend at a distance from those of the wall 4 but parallel thereto.

In turn, the stand 8 has a flat rectangular base 10 or tab-holder whose lower side is applied against the upper side of the stand 8. This base has two longitudinal edges in which identical housings 12 are formed. Each housing is profiled in a direction perpendicular to the plane of the wall 4. In this case, the profile is generally "T-shaped". Each housing is open in this direction upwards and also towards the longitudinal edge of the nearest stand 8.

The display rack 2 also comprises tabs 14 intended to be inserted and held in the respective housings and which we will now describe, referring to FIGS. 4 to 11. In this case, there are 40 tabs and housings, but this number is not limiting. For example, there could be any number from 5 to 100.

Each tab 14 comprises a body 15 having a generally flat elongated shape defined by two straight longitudinal edges parallel to each other and designed to extend in the direction of the height of the display rack. The body has a fastening end 16 and a free end 18 opposite each other along the longitudinal direction of the body.

The fastening end 16 has in plan view a "T-shape" complementary to that of the housings 12. It is intended to be inserted in any one of the housings according to a male-female arrangement by inserting the tab through the upper opening of the housing. In particular, this end has two parts in relief such as lugs 20 projecting from the longitudinal edges of the body in opposite directions.

The housing 12 and the body 15 are arranged so that, in this position, the tab can rotate freely relative to the base about an axis of rotation parallel to the longitudinal direction of the display rack. The tab is held in the housing by the complementary shapes of the end 16 and the housing. The rotational movement is made possible by a bevel 21 which forms the rear side of the fastening end 16. Thus, this flat side 21 forming the end edge of the body is inclined slightly towards the other end of the body to facilitate the angular displacement of the tab illustrated on FIGS. 14 and 15.

For example, the display rack could be arranged to allow a maximum angular displacement of the tab of 17° upwards from the horizontal plane defined by the upper side of the stand 8. This angle is given as an indication and it is not limiting. For example, the distance between the tab and the wall 4 could be increased from 3 mm to 17 mm. The distance of 3 mm corresponds to the rest position of the tabs, where the lower side of their bodies 15 rests against the stand 8, i.e. this distance is substantially equal to the thickness of the stand. More generally, the starting distance could be between 2 mm and 10 mm and the final distance between 12 mm and 30 mm.

Each tab also includes a part 24 attached to the body 15, forming a body-dyed nail model. The shade is selected to be different from that of all the other tabs. It corresponds in fact to the shade of a nail varnish intended to be sold.

The part 24 therefore has a generally flat shape intended to be attached to the upper side of the body 15, at the free end 18 and so that, at this end, the edges of the part coincide with those of the body. For attachment purposes, the part 24 has a relief 26 projecting from its lower side and intended to enter an opening 28 of the body 15. This relief has itself an elongated shape rounded at one of its two ends, like the opening 28, to provide a means of foolproofing when attaching the part to the body. Thus, only one of the end edges of the part 24 can coincide with the end of the body 15. The lower side of the part 24 has a flat shape like the area of the upper side of the body intended to receive it. The part 24 could for example be attached to the body by ultrasonic welding.

The upper side 30 of the part 24 has a slightly convex general shape similar to that of a nail and therefore has curves in planes not parallel to each other.

The part 24 has in plan view a generally flared shape with two main lateral edges 32 moving farther away from each other on approaching the free end 18 of the tab. Thus, the end of the part 24 adjacent the free end of the body is wider than the other end of this part. This shape is similar to that of a natural nail and provides a more realistic finish when the part 24 is above a user's finger as discussed below.

Figure 7:
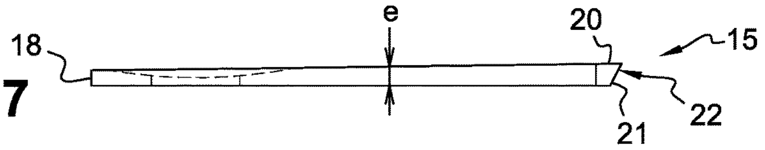
Figure 8:
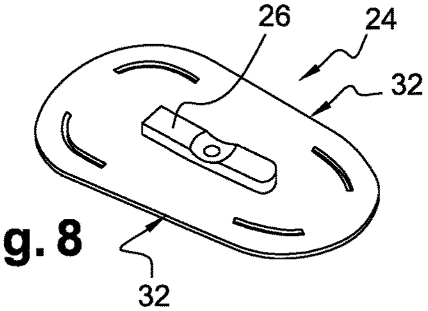
FIGS. 8 to 11 are perspective, longitudinal section and end views of the colored part of one of the tabs of the display rack shown on FIGS. 1 to 3.
Figure 9:
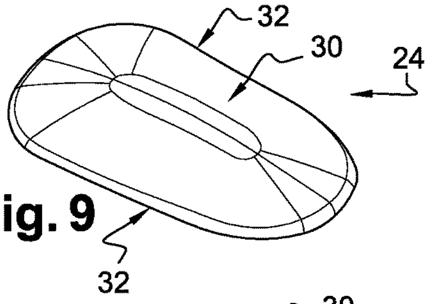
Figure 10:
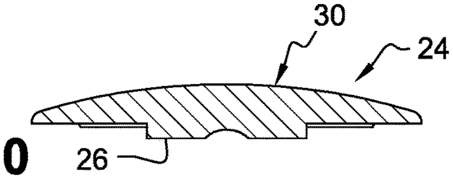
Figure 11:
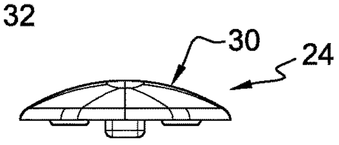

As illustrated on FIG. 7, the thickness "e" of the body 15 decreases when moving along the tab from the fastening end 16 to the free end 18. Due to the reduced thickness near this end, the colored part of the tab can be closer to the user's finger underneath.

Each body 15 has a cavity 17 formed in its lower side at the colored part. The orifice 28 extends into this cavity. It receives a part of the user's nail when she places her finger under the tab, which makes it easier to appreciate the effect of the shade at the fingertip.

Since the part 24 does not cover the entire upper side of the body 15, the free part of this side can be covered with text and drawings.

The display rack further comprises a flat rectangular elongated cover, or mask 34, adapted to cover the base 10 while closing all the housings 12 simultaneously and masking them. Thus, it is impossible to take the tabs out of their housings.

Figure 12:
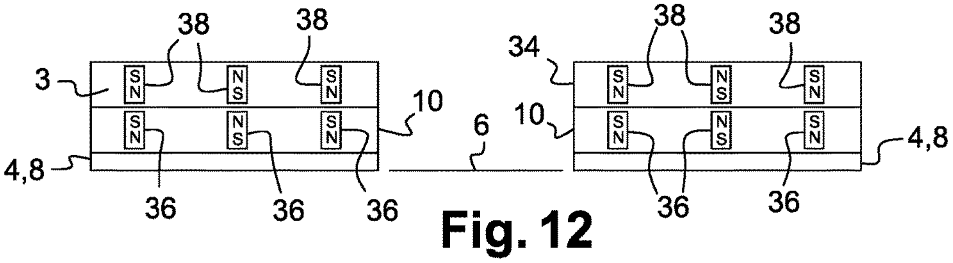
FIG. 12 shows the arrangement of the magnets in the display rack of this embodiment.

The cover 34 is firmly attached to the base 10 in this case by magnetic means consisting here of three magnets 36 of the base, shown on FIG. 12. The polarity of each magnet is directed along the thickness of the base and the magnets are lined up along its longitudinal direction. In this case, the north pole of the central magnet is directed downwards while the north poles of the magnets located at the longitudinal ends of the base are directed upwards.

The magnetic means also include in the cover three similar magnets 38 arranged in the same way as those of the base with polarities complementary to those of the magnets in the base to magnetically attach the cover to the base.

In the other part of the display rack shown on the left on FIG. 12, the cover is attached to the base by identical means except that the polarity of the magnets is reversed. As a result, not only is the corresponding cover 34 firmly attached to its own base 10, but in addition the display rack is held in the closed position of FIG. 1 since the magnets of the two covers 34 placed against each other in this position are mutually attracted. The width of the intermediate wall 6 is therefore chosen so that, in closed position, the upper sides of the covers 34 come into contact and press against each other.

The strength of the magnets is selected to separate the cover from its base easily when necessary or to open the display rack as required.

The walls 4, the stands 8, the bases 10 and the covers 34 thereby form a support for the tabs. Apart from the magnets, they can be made of plastic, for example, like the tabs. The bodies of the tabs are for example about 50 mm long and about 10 mm wide.

In this example, all the walls and the covers are black on all their visible sides. This choice highlights the different shades of the tabs. Black also makes the text on the tabs easier to read, especially when the text is written in white. Obviously, other colors could be used for these walls. In this case, the bodies of the tabs are made of a transparent material, this is a preferred embodiment, but not limiting.

Figure 13:
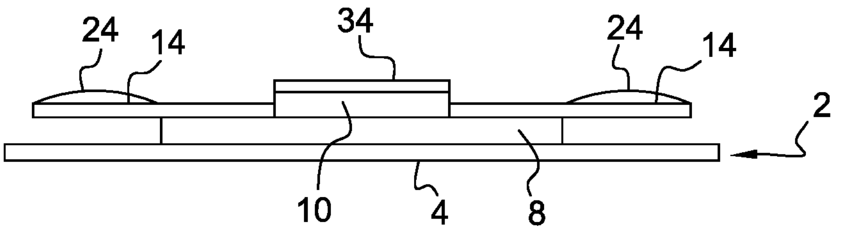
FIGS. 13 to 15 are side and perspective views illustrating the steps for using the display rack shown on FIGS. 1 to 3.
Figure 14:
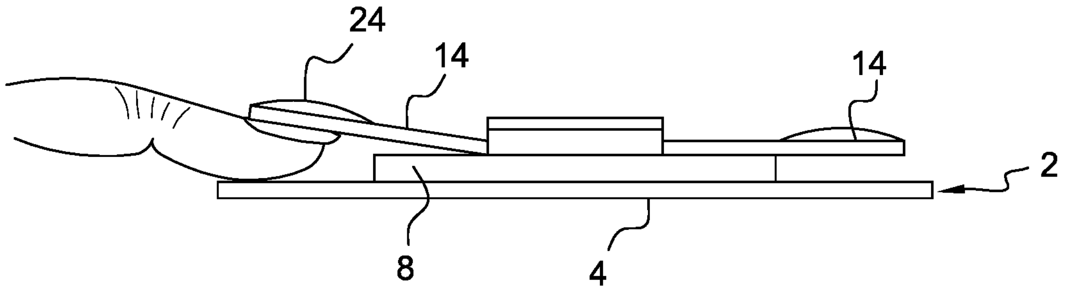
Figure 15:
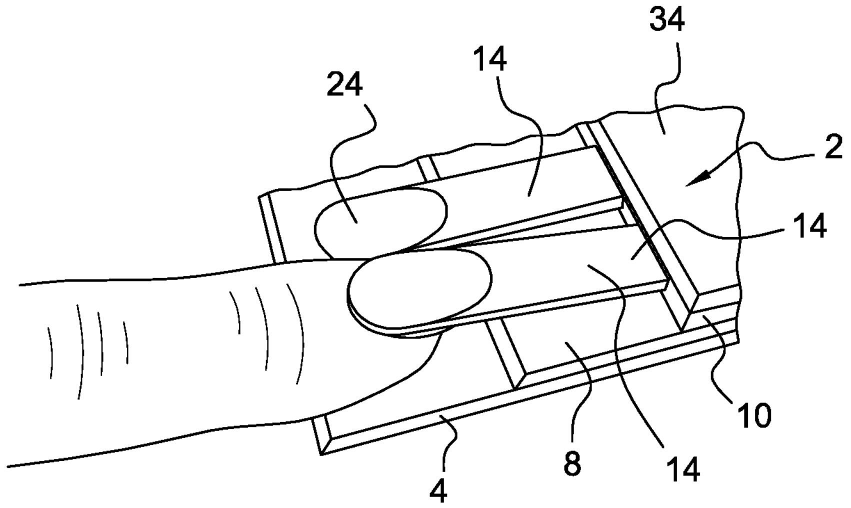

We will now describe the use of the display rack, referring to FIGS. 13 to 15.

Referring to FIG. 13, it is assumed that the display rack is open, its main walls 4 being horizontal and extending away from one another in the same plane. The tabs are held in the corresponding housings 12. The body of each tab rests by gravity on the stand 8. With this flat support for all the tabs, the tabs extend globally in the same horizontal plane. The end of each tab carrying the colored part extends parallel to and at a distance from the wall 4, past the stand 8 depending on the height, without therefore the stand being interposed between them. The wall 4 is therefore visible over a large part of the periphery of the tab and in particular around its end carrying the colored part.

When the user wishes to test or try one of the shades of nail varnish, as shown on FIGS. 14 and 15, she places her finger between the wall 4 and the chosen tab, thereby raising the tab at the colored part and rotating it relative to the support to move this part away from the wall 4. The user can therefore place her nail just underneath the colored part and observe the effect obtained with this part above her finger, as shown on FIG. 15. She then removes her finger and the tab moves back to its original position under the effect of gravity. The user can then repeat the operation as many times as she wishes with each tab of her choice.

Obviously, numerous modifications can be made without leaving the scope of the invention.

The support could comprise a single assembly formed by the main wall 4, the stand 8, the base 10 and the cover 34.

The main walls 4 could be omitted.

Each tab could be made movable relative to the support without this being a rotational movement. A sliding movement would be possible, for example.

The parts 24 are not necessarily body-dyed. They could be given a coat of varnish or any other monochrome or polychrome decoration.

The tabs with their part 24 could be made differently. For example, the tab and the part 24 could be monobloc, molded in one piece, the area corresponding to the part 24 initially having the appearance of the tab and then being given a coat of varnish or any other monochrome decoration or with patterns of different colors.

The number or arrangement of the magnets could be changed. The covers could be held on the bases or the display rack kept in closed position by means other than magnetic means.

The invention claimed is:

1. A display rack for shades of nail varnish, the display rack comprising:
- a support;
- colored tabs held on the support in a mobile manner, the support including housings holding the colored tabs such that the colored tabs are freely rotatable with respect to the support, the colored tabs being removable independently from each other, and each of the colored tabs including a protrusion configured to be inserted in the support;
- at least one cover to close openings of the housings used to insert the colored tabs, hiding the openings;
- magnetic means for holding the at least one cover against the openings; and
- at least two covers which form means for holding the display rack in a closed position.

2. Display rack according to claim 1 wherein each tab can rotate freely on the support.

3. Display rack according to claim 1 wherein each tab is mounted movably between a rest position and a test position in which a colored part of the tab extends farther from a bottom wall of the support than in the rest position.

4. Display rack according to claim 1 wherein each colored tab is removably mounted on the support.

5. Display rack according to claim 1, wherein housings are profiled in a direction perpendicular to a main plane of the support.

6. Display rack according to claim 5 wherein the colored tabs are held in the housings with sufficient clearance to allow the colored tabs to rotate relative to the support.

7. Display rack according to claim 1 wherein each colored tab has a body-dyed part with a shade different from that of at least another one of the colored tabs.

8. Display rack according to claim 1 wherein each colored tab has a flared colored part that widens towards a free end of the colored tab.

9. Display rack according to claim 8 wherein each colored tab comprises a body to which the flared colored part is attached.

10. Display rack according to claim 1 wherein each colored tab comprises a body whose thickness decreases on approaching a free end of the colored tab.

11. Display rack according to claim 1 wherein each colored tab has a colored part and a cavity formed in a lower side of the colored tab at the colored part.

12. Display rack according to claim 1 which comprises a bottom wall and a stand arranged so that, when each colored tab is in a rest position, the bottom wall is visible around it and the stand supports the colored tab at a distance from the bottom wall.

13. Display rack according to claim 12 wherein at least the bottom wall is black.

14. A display for shades of nail varnish, the display rack comprising:

a support;

colored tabs held on the support in a mobile manner, the support including housings holding the colored tabs such that the colored tabs are freely rotatable with respect to the support, the colored tabs being removable independently from each other, and each of the colored tabs including a protrusion configured to be inserted in the support;

at least two flaps movable relative to each other to define respectively an open position and a closed positions of the display rack, and adapted to extend opposite one another when the display rack is in the closed position; and magnetic means for holding the display rack in the closed position.

15. A method for preparing a display rack to allow a selection of a shade of nail varnish, the method comprising:

providing the display rack including a support;

providing housings that attaching a plurality of colored tabs to the display rack such that the colored tabs are rotatable with respect to the support, the colored tabs being removable independently from each other, each of the colored tabs including a protrusion configured to be inserted in the support;

providing at least one cover to close openings of the housings used to insert the colored tabs, hiding the openings;

providing holding magnetic means for holding the at least one cover against the openings; and providing at least two covers which form means for holding the display rack in a closed position.

* * * * *